United States Patent [19]
Herron et al.

[11] 4,249,428
[45] Feb. 10, 1981

[54] CAM FOLLOWER WITH PIVOTALLY MOVABLE CAM ENGAGABLE SHOE

[75] Inventors: William L. Herron, Elizabeth; Charles R. Odermann, Montville, both of N.J.

[73] Assignee: The Singer Company, Stamford, Conn.

[21] Appl. No.: 118,281

[22] Filed: Feb. 4, 1980

[51] Int. Cl.³ .............................................. F16H 53/06
[52] U.S. Cl. .................................. 74/569; 112/158 R
[58] Field of Search ................. 74/569, 567, 568 R, 74/568 M, 568 T; 112/316, 158 A, 158 D, 158 R

[56] References Cited

U.S. PATENT DOCUMENTS

| | | | |
|---|---|---|---|
| 2,829,541 | 4/1958 | Korte | 74/569 |
| 2,877,662 | 3/1959 | Woydt | 74/569 |
| 3,188,991 | 6/1965 | Ohira | 74/569 X |
| 3,990,373 | 11/1976 | Baruffa et al. | 112/316 |

Primary Examiner—Peter P. Nerbun
Attorney, Agent, or Firm—William V. Ebs; Robert E. Smith; Edward L. Bell

[57] ABSTRACT

A cam follower including an arm pivotally movable about an axis which is perpendicular to the axis of rotation of an actuating cam is provided with a shoe that pivots on the arm to maintain line contact with the cam as the cam is rotated.

2 Claims, 3 Drawing Figures

CAM FOLLOWER WITH PIVOTALLY MOVABLE CAM ENGAGABLE SHOE

BACKGROUND OF THE INVENTION

1. Field of the Invention

The invention relates to cam and cam follower arrangements, and in particular to such arrangements wherein a cam follower is pivotally movable about an axis which is perpendicular to the axis of rotation of an actuating cam.

2. Description of the Prior Art

Space limitations and other considerations imposing restrictions on the design of a mechanism sometimes require that a pivotally mounted cam follower be movable by a rotatable cam about an axis which is perpendicular to the axis of the rotatable cam. In such arrangements there is point contact between the engaging surfaces of the cam and cam follower as the cam follower is pivoted by the cam, and the cam follower digs into the actuating cam resulting in excessive wear and damage to the engaging parts.

SUMMARY OF THE INVENTION

In accordance with the invention, a cam follower including an arm pivotally movable about an axis which is perpendicular to the axis of rotation of an actuating cam is provided with a shoe to pivot on the arm of the follower and maintain line contact with the cam. The shoe is preferably formed of sheet metal or of plastic which is wear resistant, and is preferably configured to fit over an end portion of the cam follower arm and pivot on a finger depending from the arm. The arrangement of the invention has particular application is sewing machines, as for example, where a work feeding control includes a knob which is operable to rotate a disc cam and cause a cam follower that is pivotally mounted about an axis perpendicular to the axis of the disc cam, to be disposed in a position to activate cam controlled feed mechanism.

DESCRIPTION OF THE PREFERRED EMBODIMENT

Figure 1:
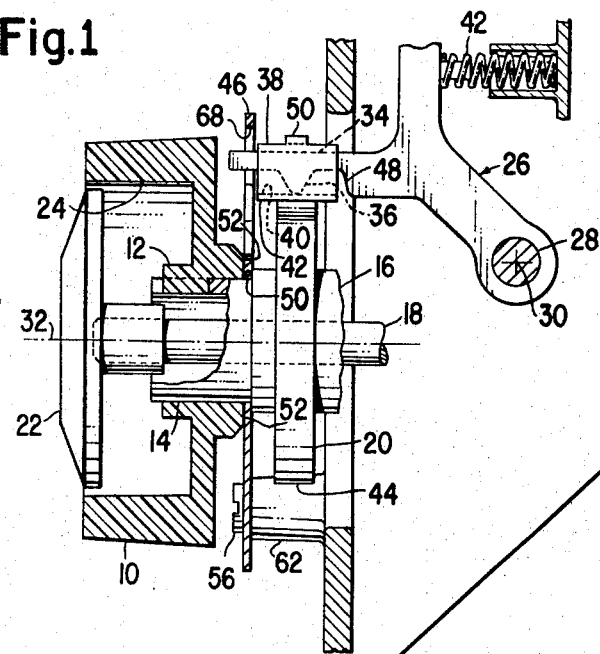
FIG. 1 is a vertical sectional view of a sewing machine feed control which includes the cam and cam follower arrangement of the invention.
Figure 2:
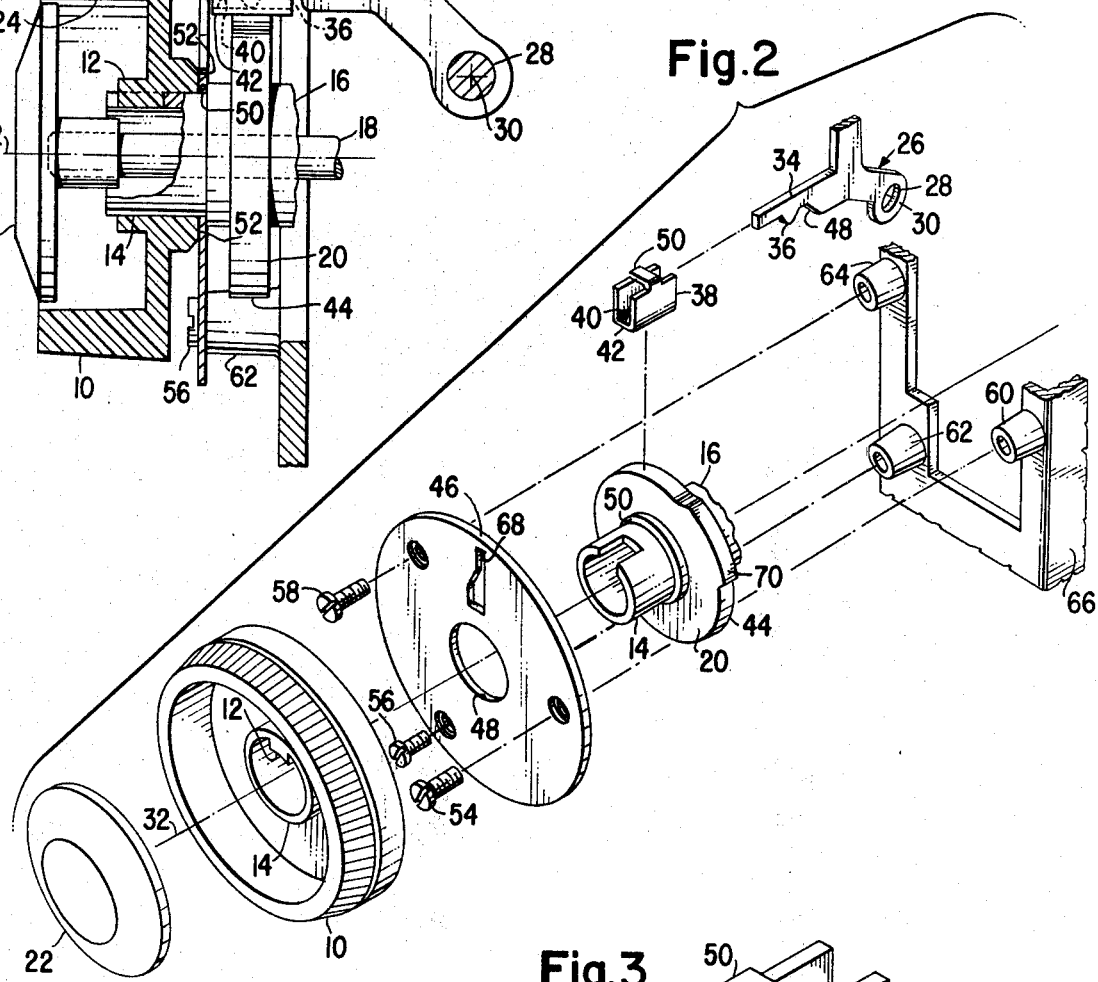
FIG. 2 is an exploded perspective view of the feed control of FIG. 1.

Referring to FIGS. 1 and 2 of the drawings, reference character 10 designates the feed control knob of a sewing machine. The knob is rotationally fixed by a key 12 to the hollow end portion 14 of a cam hub 16 which is mounted for rotation on a longitudinally movable shaft 18. Cam hub 16 includes a disc cam 20 as an integral part thereof. The cam hub 16 and disc cam 20 can be turned in unison by knob 10. A quick reverse feed button 22 movable in a recess 24 in the knob 10 is attached to shaft 18 for use in positioning the shaft longitudinally.

Figure 3:
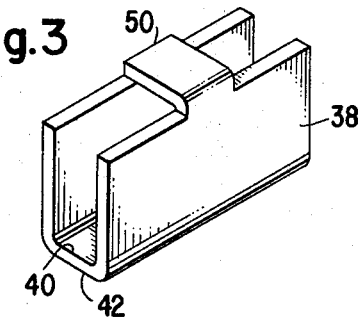
FIG. 3 is a perspective view of a cam follower shoe for the cam and cam follower arrangement of the invention.

A cam follower 26 pivotally mounted for movement on a shaft 28 about an axis 30 perpendicular to the rotational axis 32 of cam hub 16 and disc cam 20 is positionable by the cam disc when rotated by knob 10. As shown, the cam follower 26 includes an arm 34 which normally extends generally parallel to cam hub 16 and shaft 18. Such arm 34 includes a depending finger 36. In accordance with the invention, a shoe 38 formed of sheet metal or of plastic having wear resistant characteristics, and substantially U-shaped in cross section (see FIG. 3) is provided on arm 34 to engage disc cam 20. The shoe is loosely slidable over the arm where it is disposed for engagement on its bottom inside surface 40 with finger 36. A spring 42 biases the cam follower 26 counterclockwise as viewed in FIG. 1 to maintain the finger 36 against the bottom inside surface 40 of the shoe and the bottom outside surface 42 of the shoe against the circumferential periphery 44 of disc cam 20. A stationary plate 46 and an abutment 48 on cam follower 26 confine the shoe 38 longitudinally on the arm 34. An integral tab 50 on the shoe extends over the top of arm 34.

As shown, plate 46 includes a central opening 48 for the end portion 14 of cam hub 16. One side of the plate engages a ledge 50 on the hub 16 and the other side of the plate is engaged by a boss 52 on control knob 10. The plate is secured by screws 54, 56 and 58 in threaded bosses 60, 62 and 64, respectively, on a frame 66. A vertical slot 68 in plate 46 receives and guides an end portion of cam follower arm 34.

Button 22 acting through shaft 18 and conventional mechanism (not shown) serves when depressed to effect a reversal in the feeding direction of work on a sewing machine. Knob 10, if turned to locate the top of a step 70 on the periphery of disc cam 20 under shoe 38, causes the cam follower 26 to activate cam controlled feed mechanism (not shown) such that work is fed in a predetermined manner to provide for the formation of stitch patterns as defined by pattern cams. Such cam controlled feed mechanism is well known in the sewing machine art and the specific details thereof are not pertinent to the present invention.

As the disc cam 20 is turned by knob 10, the shoe 38 maintains line contact with the peripheral circumferential surface 44 of disc cam 20. Such line contact is maintained even as the shoe is moved from a low level line contacting position with the cam's peripheral surface to the top of step 70 since the shoe pivots at the same time on finger 36 about an axis perpendicular to the said line and so compensates for angular movement of the cam follower arm 34 relative to the cam surface 44. A substantial length of the shoe and width of the disc cam engage at all times and wear on the contacting surfaces is therefor minimized. Gouging and grooving of the periphery of the disc arm is eliminated and the life of the disc is thereby extended especially when the disc cam is of plastic which is the preferable material for this part because of the ease with which it can be fabricated and because of cost considerations.

It is to be understood that the present disclosure relates to a preferred embodiment of the invention which is for purposes of illustration only and that it is not to be construed as a limitation of the invention. Numerous alterations and modifications of the structure herein disclosed will suggest themselves to those skilled in the art, and all such modifications and alterations which do not depart from the spirit and scope of the invention are intended to be included within the scope of the appended claims.

We claim:

1. In combination, a rotatable cam with a peripheral camming surface, and a cam follower which is pivotally movable thereby about an axis substantially perpendicular to the axis of rotation of the rotatable cam, said cam follower including an arm with a projecting finger and a shoe on the arm in line contact with the rotatable cam across its peripheral surface, the shoe being pivotally movable on the finger about an axis perpendicular to the said line whereby line engagement is maintained between the shoe and said peripheral camming surface as the cam follower is moved by the rotatable cam.

2. The combination of claim 1 wherein the shoe extends about the cam follower arm and is substantially rectangular in cross section.

* * * * *